May 12, 1931.　　　T. R. SMITH　　　1,804,711
VALVE
Filed April 9, 1927
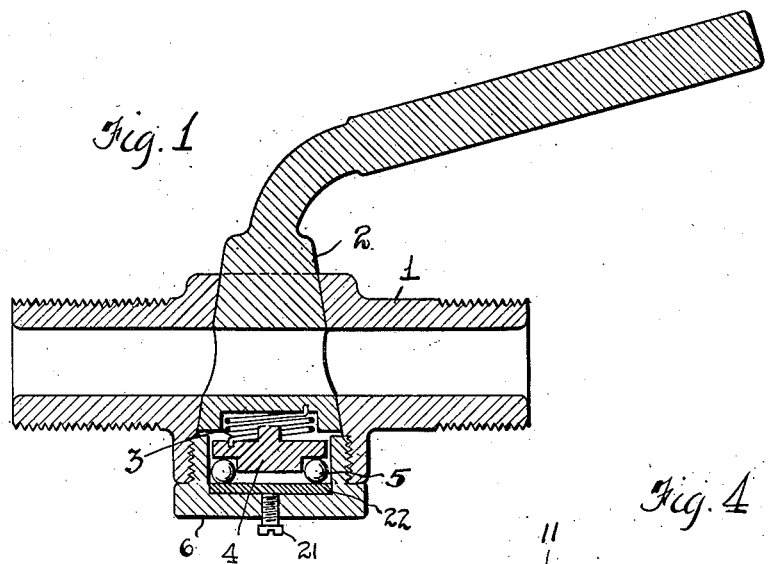
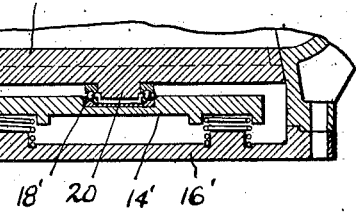
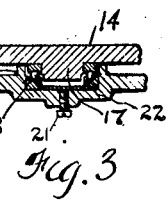
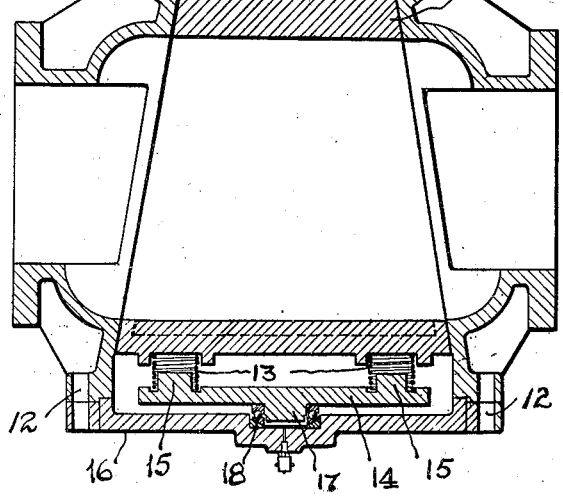
INVENTOR.
Thomas Russell Smith.
BY
Fay, Oberlin & Fay
ATTORNEYS Patented May 12, 1931

1,804,711

UNITED STATES PATENT OFFICE

THOMAS RUSSELL SMITH, OF YOUNGSTOWN, OHIO

VALVE

Application filed April 9, 1927. Serial No. 182,333.

This invention relates to valves, and more particularly valves of the turn plug type; and it is among the objects of the invention to provide for maintaining the valve-plug in close fitting relation, and a further object is the provision therewith of a construction to avoid dragging and sticking even with very large sizes. Other objects and advantages will appear as the description proceeds.

To the accomplishment of the foregoing and related ends, the invention, then, consists of the features hereinafter fully described, and particularly pointed out in the claims, the following description and the annexed drawings setting forth in detail but a few of the various ways in which the principle of the invention may be employed.

In said annexed drawings:—

Fig. 1 is a longitudinal medial section of an embodiment of the invention; Fig. 2 is a similar view of a modification; and Figs. 3 and 4 are sectional details.

Referring more particularly to the drawings, the numeral 1 designates a valve-body, having a bore preferably tapering to receive a valve-plug 2. Bearing against the base of the valve-plug, preferably partly recessed therein is a spring 3. This may be of any convenient form, for instance a coil-spring or a split spring-washer. Backing up the spring is a supporting member 4 having at its reverse side a race for rotatable bearing elements or balls 5 in cooperation with a closure head 6 which is secured to the valve body, for instance by screw threaded engagement.

Where desired, as in large size valves, the stem 7 of the valve-plug 11 may be squared at the end to receive an operating handle 8. A stuffing box 9 may also be provided. As resilient retaining means, a set of springs 13 is positioned against the base of the valve-plug, preferably being partly recessed therein or otherwise held in proper position. In coaction is a supporting disk 14, the disk being arranged with projections or other suitable means as at 15 for centering and holding the springs. At the reverse side of the supporting-disk is a projection 17 centrally located, and serving to center and hold a ball race or the like 18, the cooperating member of such ball race seating in a recess or the like in a closure head 16. The closure-head is secured to the valve body by suitable means, for instance by bolts through the bolt-holes 12. As a further refinement, where desired, adjustment for the pressure on the springs may be provided by a regulating screw 21 in the closure head bracing against a wearing plate or thrust plate 22.

In some cases it is desirable to provide an annular rib 19, Fig. 3, about the ball-race as an assistance in preventing lubricant from escaping. I also contemplate arranging the bearing against the plug, although generally this is not as desirable. In such arrangements the ball race 18', Fig. 4, can be centered on a projection 20 on the valve-plug 11, and the springs 13' may be positioned between the supporting member 14' and the closure head 16'.

With a valve of this character, it will be seen that the valve-plug may be maintained in seating relation by uniform pressure, and at the same time such spring means as is used is prevented from exerting a dragging effect, so that the valve-plug may be easily turned for opening or closing, and even in the very large sizes, such as customarily require machine operation, direct hand-operation becomes possible.

Other modes of applying the principle of the invention may be employed, change being made as regards the particular details disclosed, provided the means stated in any of the following claims, or the equivalent of such, be employed.

I therefore particularly point out and distinctly claim as my invention:—

1. In a valve, the combination of a valve body, a tapering valve-plug therein having an operating handle at its small end, a set of symmetrically positioned decentered springs supporting said plug, a disk engaging said springs, a closure-head secured to the valve body, and means for preventing dragging action by the springs, said means including ball bearing elements between said valve-plug and said closure-head.

2. In a valve, the combination of a valve-body, a tapering valve-plug therein, a closure-head opposite said valve-plug, a set of spaced-apart decentered springs between said valve-plug and said closure-head, a rotatable disk engaging said springs, means on the disk for maintaining the position of the springs, and means for preventing dragging action of the springs, said means including rotatable bearing elements for the disk.

3. In a valve, the combination of a valve-body, a tapering valve-plug therein, a closure-head opposite said valve-plug, a set of springs between said valve-plug and said closure-head, a rotatable disk supporting said springs, means for positioning the springs in spaced-apart relation, and a central projection and an aligned recess for seating a ball race between said disk and the closure-head.

4. In a valve, the combination of a valve-body, a tapering valve-plug therein, a set of spaced-apart springs bearing against the base of said valve-plug, a rotatable disk supporting said springs, said disk having a central projection, a closure-head secured to the valve-body, and a ball race interposed between said disk and said closure-head, being positioned by the central projection of the disk and an opposite recess in the closure-head.

Signed by me this 25th day of March, 1927.

THOMAS RUSSELL SMITH.